United States Patent
Nanouk

(10) Patent No.: US 10,807,663 B1
(45) Date of Patent: Oct. 20, 2020

(54) SUPPORT WHEEL ADJUSTMENT MECHANISM FOR A BICYCLE

(71) Applicant: Martin Nanouk, Kotzebue, AK (US)

(72) Inventor: Martin Nanouk, Kotzebue, AK (US)

( * ) Notice: Subject to any disclaimer, the term of this patent is extended or adjusted under 35 U.S.C. 154(b) by 177 days.

(21) Appl. No.: 16/026,875

(22) Filed: Jul. 3, 2018

(51) Int. Cl.
*B62H 1/12* (2006.01)

(52) U.S. Cl.
CPC ..................... *B62H 1/12* (2013.01)

(58) Field of Classification Search
CPC ....................................................... B62H 1/12
See application file for complete search history.

(56) References Cited

U.S. PATENT DOCUMENTS

| | | | |
|---|---|---|---|
| 4,154,452 A * | 5/1979 | Newman | B62J 27/00 280/1.189 |
| 5,100,163 A * | 3/1992 | Egley | B62H 1/12 280/293 |
| 5,707,069 A | 1/1998 | Brevets | |
| 7,556,277 B2 | 7/2009 | Lytle | |
| 8,006,994 B2 * | 8/2011 | Chen | B62H 1/12 280/293 |
| 9,284,002 B2 * | 3/2016 | Robertson | F16C 1/12 |
| 10,017,220 B2 * | 7/2018 | Wang | B62H 1/12 |
| 2017/0334496 A1 * | 11/2017 | Di Vitto | B62H 1/12 |
| 2019/0106168 A1 * | 4/2019 | Khouri | B62H 1/12 |

* cited by examiner

*Primary Examiner* — Kevin Hurley
(74) *Attorney, Agent, or Firm* — Sanchelima & Associates, P.A.; Christian Sanchelima; Jesus Sanchelima

(57) ABSTRACT

The present invention is a support wheel adjustment mechanism for a bicycle provided on either side of bicycle. Each support wheel mechanism includes a first element, a second element, a swivel hinge connection, an adjustable element and a fixing element. First element and second element are connected with each other by swivel hinge connection. Adjustable element has one end portion connected with hinge connection with first element and another end portion is selectively connected to any of adjustment openings such that support wheels are achieves desired elevation from ground. Adjustable element is secured in adjustment openings by use of fixing element.

7 Claims, 6 Drawing Sheets

US 10,807,663 B1

SUPPORT WHEEL ADJUSTMENT MECHANISM FOR A BICYCLE

BACKGROUND OF THE INVENTION

1. Field of the Invention

The present disclosure relates to a training aid attachment for bicycles. More particularly, the present disclosure relates to a support wheel adjustment mechanism for a bicycle that easily adjusts support wheels at variable elevations from ground conditions for enabling children to learn to ride bicycle.

2. Description of the Related Art

When a child (or user) starts to ride a bicycle, child/user may not have the skill to balance bicycle because of dynamic lateral instability of bicycles. While learning to ride a bicycle, a child/user may fall a number of times because of incapability to balance and at some occasions can be badly injured. To avoid such fall and injury, support wheels are attached that touches the ground and provides stability to child/user, however, child/user may not experience the feel of balancing their own body weight on two wheels of bicycle. Over a period of practice, support wheels are removed and a parent or a guardian assist child to keep a balance by holding bicycle. However, even parent or guardian eventually requires letting go the child and learn balancing. At such situations also, the child may fall and get badly injured.

Several designs of various support/auxiliary wheels for bicycles have been designed in the past. None of them, however, include a support wheel mechanism for a bicycle that facilitates easy manipulation/adjustment of support wheels at variable elevations from ground conditions and hence provide experience of self-balancing without fear and enabling children to learn to ride bicycle.

Applicant believes that a related reference corresponds to U.S. Pat. No. 7,556,277 filed by Lytle Kimberly M titled 'Bicycle training aid with dynamically deployable balancing features' discloses a mechanism for deploying the balancing mechanisms which is remotely controlled by adult supervisor. However, the mechanism is moreover operable by parent and because of parental control, child may not be able to gain riding confidence as child may not be able to identify and correct upon his/her mistake.

Another U.S. Pat. No. 5,707,069 filed by Brevets Futek M S M Ltee titled 'Stabilizer training wheel for bicycle' discloses a side wheel attachment for removably attaching an auxiliary side wheel to a bicycle. However, the disclosure does not explicitly mention on adjusting height of stabilizer training wheel.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. The present invention is a support wheel adjustment mechanism for a bicycle provided on either side of bicycle. Each support wheel mechanism includes a first element, a second element, a swivel hinge connection, an adjustable element and a fixing element. First element and second element are connected with each other by swivel hinge connection. Adjustable element has one end portion connected with hinge connection with first element and another end portion is selectively connected to any of adjustment openings such that support wheels achieves desired elevation from ground. Adjustable element is secured in adjustment openings by use of fixing element.

It is one of the main objects of the present invention is to provide a support wheel adjustment mechanism for a bicycle that facilitates easy adjustment of support wheel at different elevations from ground and thereby facilitate learning riders to gain gradual balancing and thereby independently gain riding confidence without fear.

It is another object of this invention is to provide a support wheel adjustment mechanism for a bicycle that easily and quickly adjust support wheels at various elevations from ground and hence makes easier for a child to learn to ride a bicycle.

It is another object of this invention is to provide a support wheel adjustment mechanism for a bicycle that has fewer and structurally less complex elements and hence are easy to manufacture and assemble and hence is cost effective.

It is another object of this invention is to provide a support wheel adjustment mechanism for a bicycle that has easy to operate mechanism for adjusting support wheels at desired elevation in less time and efforts.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
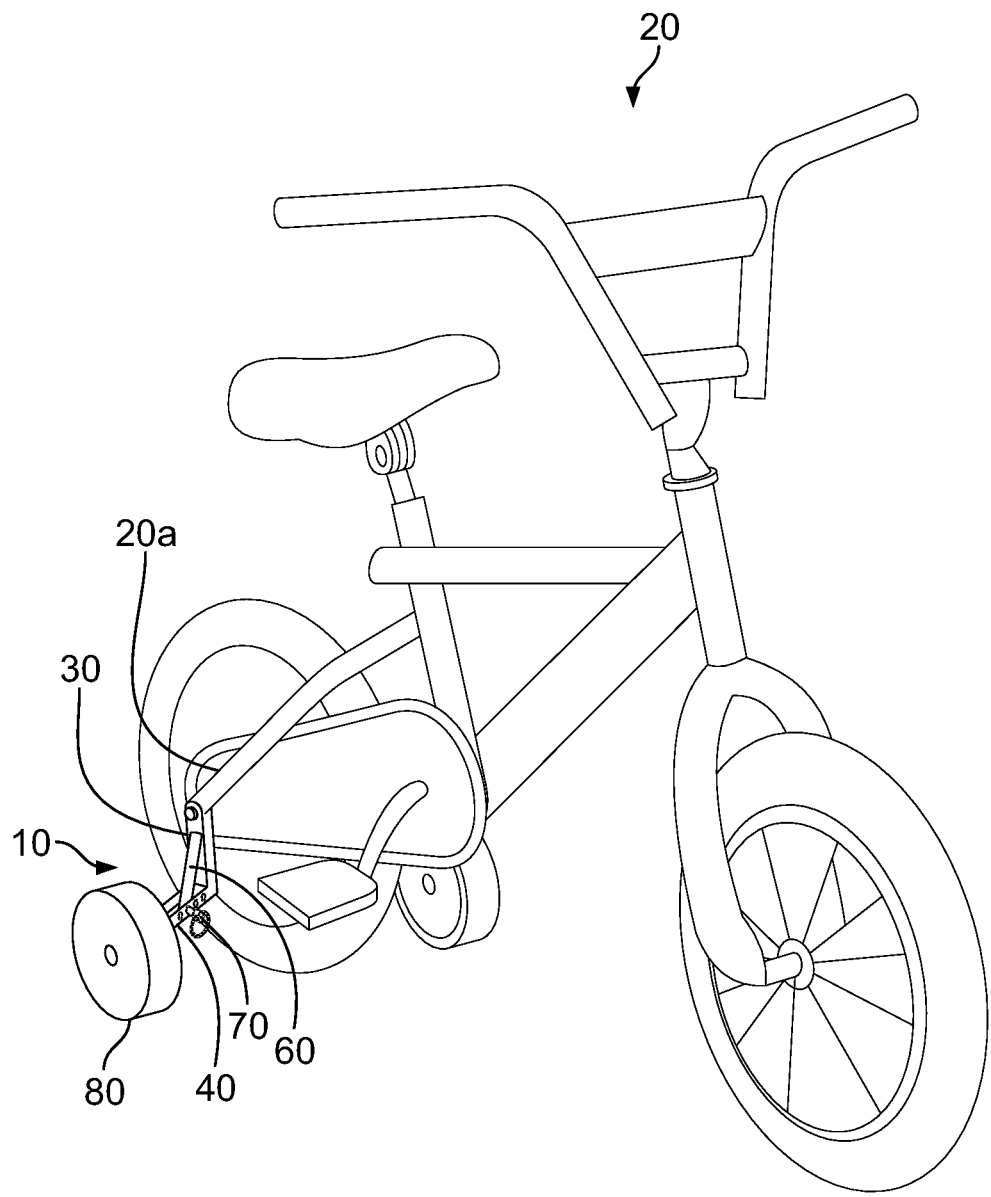
FIG. 1 represents a perspective representation of a support wheel mechanism fitted in a bicycle, in accordance with one embodiment of the present invention.
Figure 2:
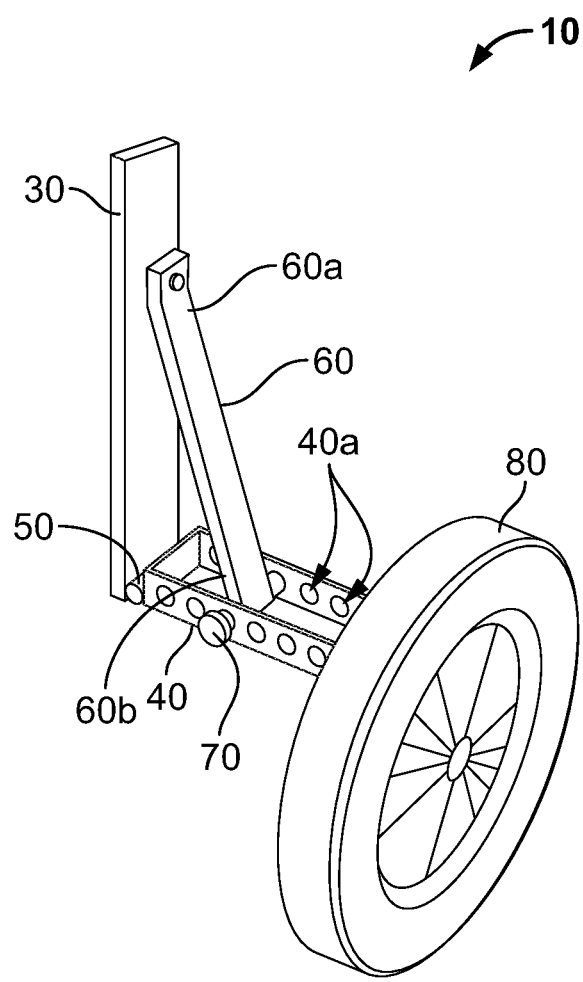
FIG. 2 represents an enlarged perspective view support wheel mechanism of FIG. 1 with support wheel.
Figure 3:
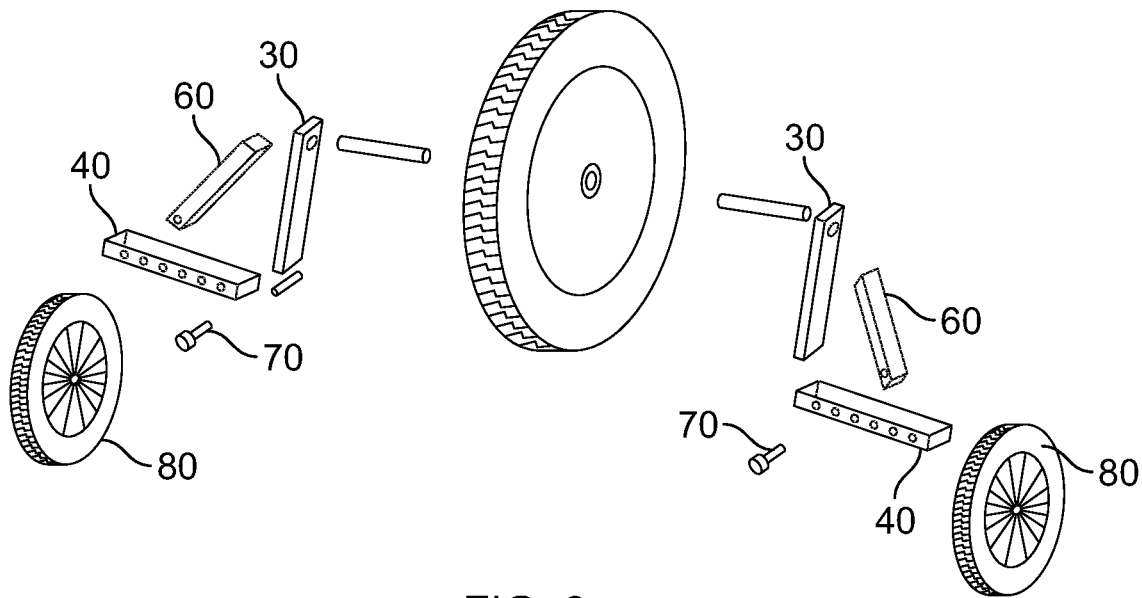
FIG. 3 represents an exploded view of support wheel mechanism of FIG. 1.
Figure 4:
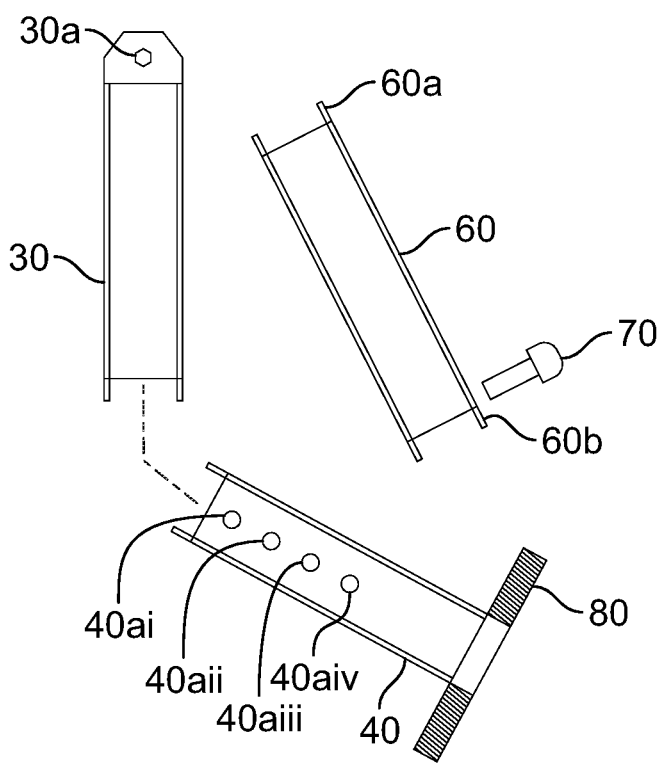
FIG. 4 represents an exploded view of support wheel mechanism of FIG. 1.
Figure 5:
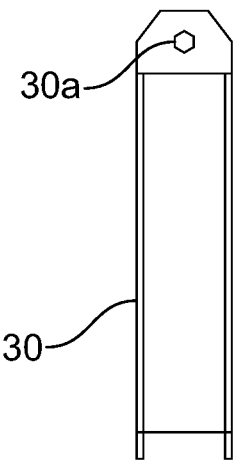
FIGS. 5 to 7 represent front views of a first element, a second element and an adjustable element respectively of support wheel mechanism of FIG. 1.
Figure 6:
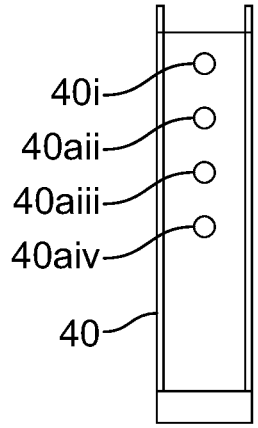
Figure 7:
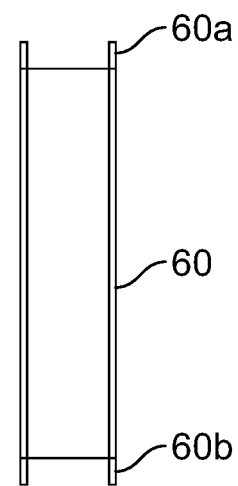

Referring now to the drawings (FIGS. 1 to 10), where the present invention is generally referred to with numeral 10, it can be observed that a pair of support wheel adjustment mechanisms for a bicycle 20, in accordance with one embodiment, is provided. Each pair of support wheel mechanisms 10 includes a first element 30, a second element 40, a swivel hinge connection 50, an adjustable element 60 and a fixing element 70.

First element 30 is an elongated element that is capable to be fixed with frame 20a of bicycle 20. First element 30 is connected to frame 20a by using one or more fastener(s). Typically, fastener(s) is arrangement of bolt and nut. Fasteners can be fixedly inserted in at least one hole 30a provided on first element 30. Fastener(s) enable easy dismantling of first element 30 from frame 20a when desired. Alternatively, the first element 30 can be connected to frame 20a by use of weld joint or can be positioned on a shaft 30b through a bearing. Size of first element 30 can be varied depending on size and different types of bicycles. Material for first element 30 is preferred to be metallic for longer durability, however, polymeric or any other type of material or combination of materials is within the scope of the present disclosure.

Second element 40 is also an elongated element which has one end portion connected to first element 30 by using swivel hinge connection 50. Connection of second element 40 and first element 30 by using swivel hinge connection 50 provides desired relative motion therebetween. Though, the present disclosure is described by using swivel hinge connection 50 for connecting second element 40 and first element 30, however, the present invention is not limited to use of swivel hinge connection 50 and other types of connection/joints that can provide relative movement of second element 40 and first element 30 are within the scope of the present disclosure. Another end portion of second element 40 is configured to receive a support wheel 80.

Second element 40 is positioned substantially transverse to first element 30 basically forming an L-shaped structure. Second element 40 has a plurality of adjustment openings 40a. In a depicted embodiment, there are four adjustment openings 40ai, 40aii, 40aiii, 40aiv provided, however, less or more number of adjustment openings 40a is within the scope of the present disclosure. Size of second element 40 can be varied depending on requirement of number of adjustment openings 40a. Material for second element 40 is preferred to be metallic for longer durability, however, polymeric or any other type of material or combination of materials is within the scope of the present disclosure.

Figure 8:
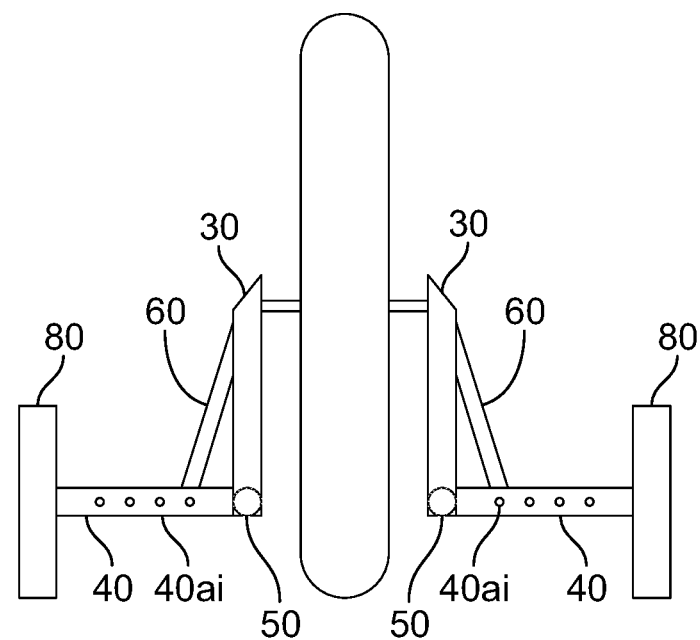
FIG. 8 represents a schematic representation of position of support wheels at a first adjustment point.
Figure 9:
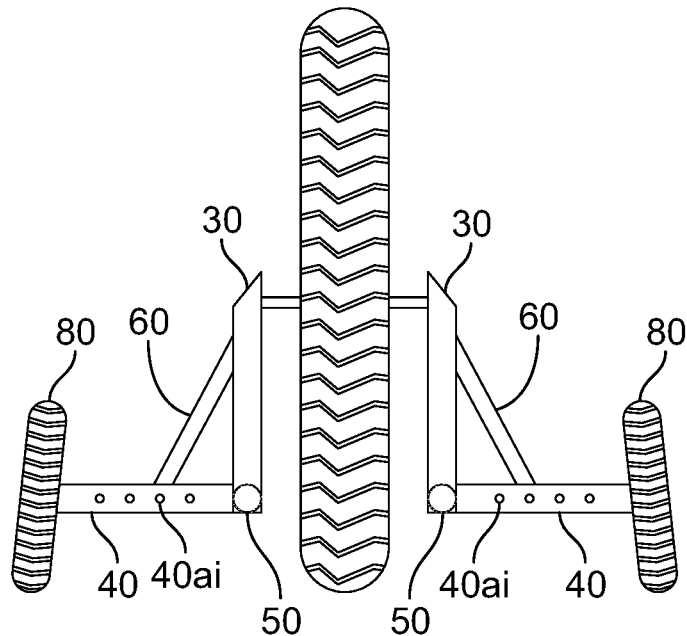
FIG. 9 represents a schematic representation of position of support wheels at an intermediate (second) adjustment point.
Figure 10:
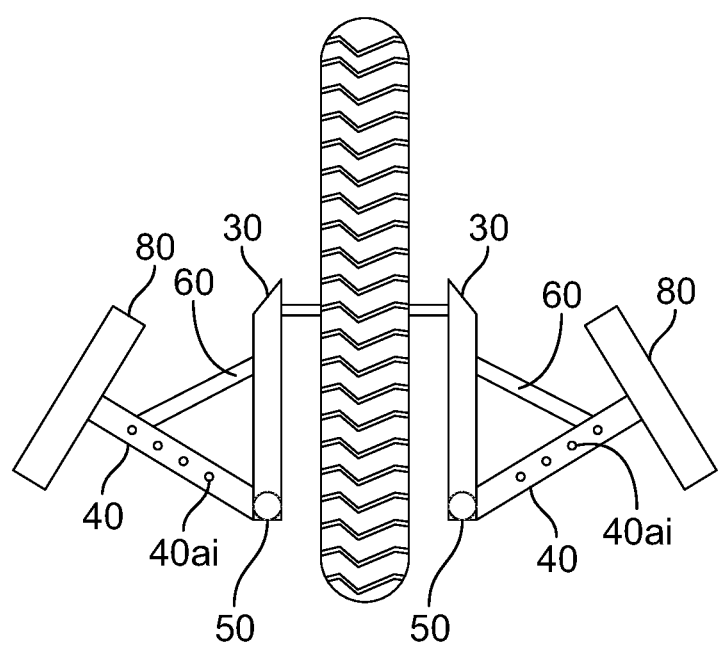
FIG. 10 represents a schematic representation of position of support wheels at a last adjustment point.

Adjustable element 60 has a first end portion 60a and a second end portion 60b. First end portion 60a is pivotally connected to first element 30. Second end portion 60b is removable connected with desired adjustment opening 40a by using fixing element 70. Moreover, as illustrated, there are four adjustment openings 40ai, 40aii, 40aiii, 40aiv and second end portion 60b, in one instance, can be connected to any one of four adjustment openings 40ai, 40aii, 40aiii, 40aiv. As shown in FIG. 8, when second end portion 60b is connected to adjustment opening 40ai, then support wheel 80 is in contact with ground. As shown in FIG. 9, As shown in FIG. 9, when second end portion 60b is connected to adjustment opening 40aii, then support wheel 80 is slightly raised from ground. Such elevation of support wheel 80 from ground helps child/user to initiate learning of balancing of bicycle 20. When second end portion 60b is connected to an intermediate adjustment opening 40aii, then support wheel 80 is slightly raised from ground. Such elevation of support wheel 80 from ground helps child/user to initiate learning of balancing of bicycle 20. When second end portion 60b is connected to another intermediate adjustment opening 40aiii, then support wheel 80 is still more raised from ground. Such elevation of support wheel 80 from ground helps child/user to gain more confidence of balancing of bicycle 20. As shown in FIG. 10, when second end portion 60b is connected to a last adjustment opening 40aiv, then support wheel 80 is raised much higher from ground such that child/user can almost enjoy independent ride of bicycle 20 without much support provided by support wheel 80. Such elevation of support wheel 80 from ground boosts child/user and thereby enables them to perform desired balancing of bicycle 20.

In one embodiment, the width of adjustable element 60 is less than the width of first element 30 and second element 40 and the width of second element 40 is less than the width of first element 30. Such change in width provides easy fitment over each other. However, the width of at least two of first element 30, second element 40 and adjustable element 60 can be equal in size.

Fixing element 70 is manipulated by child/user to fix another end portion of second end portion 60b with any one of adjustment openings 40ai, 40aii, 40aiii, 40aiv. In an exemplary embodiment, fixing element 70 is a removable pin. Alternatively, fixing element 70 can be any other fasteners that can easily create connection and disconnection between second end portion 60b and any of adjustment openings 40. Fixing element 70 can be an independent element or can be configurable to be an integrated part of second end portion 60b and adjustment openings 40, for instance, push and lock mechanism in which when second end portion 40b is pushed in adjustment openings 40ai, second end portion 40b gets locked in any adjustment openings 40 and when pulled second end portion 40b gets un-locked in any adjustment openings 40. Fixing element 70 is connected manually or can be connected automatically by used of actuating mechanism (not illustrated in Figures).

As support wheel adjustment mechanisms 10 provided on either side of bicycle 20 provides gradual learning of balancing of bicycle 20 and hence removes fear from child/user mind and also helps them to independently learn balancing without any support from parent or guardian. Further, adjustment of elevation of support wheel 80 is easy task with less efforts and requirement of any external tool. Support wheel adjustment mechanism 10 for a bicycle that has fewer and structurally less complex elements and hence are easy to manufacture and assemble and hence is cost effective.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A support wheel adjustment mechanism disposed on either side of a bicycle, each mechanism comprising:
   a. a first element fixedly connected to a shaft of a frame of the bicycle;
   b. a second element including four sidewalls defining a rectangular frame with a slot therein, said four sidewalls of said second element including a set of parallel sidewalls having a plurality of corresponding circular openings located thereon, a second end of said second element receiving a support wheel thereon;
   c. a swivel hinge connection configured to connect said first element and said second element, said first element and said second element forming an L-shaped structure;
   d. an adjustable element defined with a first end portion and a second end portion, said first end portion pivotally connected to said first element and said second end portion selectively connected and disconnected with an adjustment opening of said adjustment openings, said second end portion of being fitted through said slot to be mounted; and e. a fixing element adapted to fix and remove connection between said adjustable element and said second element.

2. The mechanism as claimed in claim 1, wherein said first element defined with a hole for introducing a fastener for connecting said first element with said shaft of said frame.

3. The mechanism as claimed in claim 2, wherein said fastener is a bolt and nut arrangement.

4. The mechanism as claimed in claim 1, wherein said first element is connected to said frame by a weld joint.

5. The mechanism as claimed in claim 1, wherein said fixing element is a removable pin.

6. The mechanism as claimed in claim 1, wherein said fixing element is a push and lock mechanism.

7. A system for a support wheel adjustment mechanism disposed on either side of a bicycle, comprising:

a) a bicycle having a frame with a shaft and a rear wheel;

b) a first element having a rectangular shape, said first element including a top end with an upper portion having a hole located thereon, wherein said hole receives a fastener to be mounted onto said shaft;

c) a swivel hinge connection attached to a bottom end of said first element;

d) a second element including four sidewalls defining a rectangular frame with a slot therein, a first end of said second element mounted to said swivel hinge to be positioned transversely to said first element forming an L-shaped structure, said four sidewalls of said second element including a set of parallel sidewalls having a plurality of corresponding circular openings located thereon, a second end of said second element receiving a support wheel thereon;

e) an adjustable element having a rectangular shape with a first end portion and a second end portion, said second end portion being pivotally connected to said first element, said second end portion having an opening therethrough, said adjustable element having a width less than said first element and said second element, said second end portion being fitted within said slot of said second element; and f) a fixing element fitted through said plurality of corresponding circular openings locking said adjustable element to said second element, said fixing element being a removable element.

* * * * *